United States Patent [19]

Gibson et al.

[11] 4,104,448

[45] Aug. 1, 1978

[54] ALKALI METAL-SULPHUR CELLS

[75] Inventors: John George Gibson, Whatstandwell; Alec Roger Tilley, Blackbrook, nr. Belper, both of England

[73] Assignee: British Railways Board, London, England

[21] Appl. No.: 730,771

[22] Filed: Oct. 8, 1976

[51] Int. Cl.$^2$ .......................................... H01M 10/38
[52] U.S. Cl. ..................................... 429/72; 429/104; 29/623.2
[58] Field of Search ............... 429/104, 101, 102, 112, 429/30, 31, 191, 185, 218, 72; 29/623.2

[56] References Cited

U.S. PATENT DOCUMENTS

| 3,533,848 | 10/1970 | Winn | 429/30 X |
|---|---|---|---|
| 3,770,502 | 11/1973 | Nakabayashi | 429/104 |
| 3,833,420 | 9/1974 | Will | 429/104 |
| 3,982,957 | 9/1976 | Jones et al. | 429/163 |
| 3,994,745 | 11/1976 | Ludwig | 429/81 |
| 4,006,281 | 2/1977 | Markin et al. | 429/104 X |

FOREIGN PATENT DOCUMENTS 1,356,576 6/1974 United Kingdom ..................... 429/104

Primary Examiner—Anthony Skapars
Attorney, Agent, or Firm—Pollock, Vande Sande & Priddy

[57] ABSTRACT

An alkali metal-sulphur cell comprising an outer tube, an inner tube forming the solid electrolyte of the cell and dividing the interior of the outer tube into anode and cathode compartments adjacent respective sides of the inner tube, and an alkali metal reservoir communicating with the anode compartment, has a gas space above the alkali metal in the reservoir, such that at the operating temperature of the cell the gas pressure in the reservoir will force alkali metal to flow from the reservoir into the anode compartment to maintain the operative surface area of the inner tube covered with liquid alkali metal during discharge of the cell. An advantageous method of forming such a cell entails evacuating the anode compartment when empty of alkali metal. A further advantageous method feature is to form the reservoir with the contained alkali metal and gas space as a sub-assembly.

10 Claims, 3 Drawing Figures

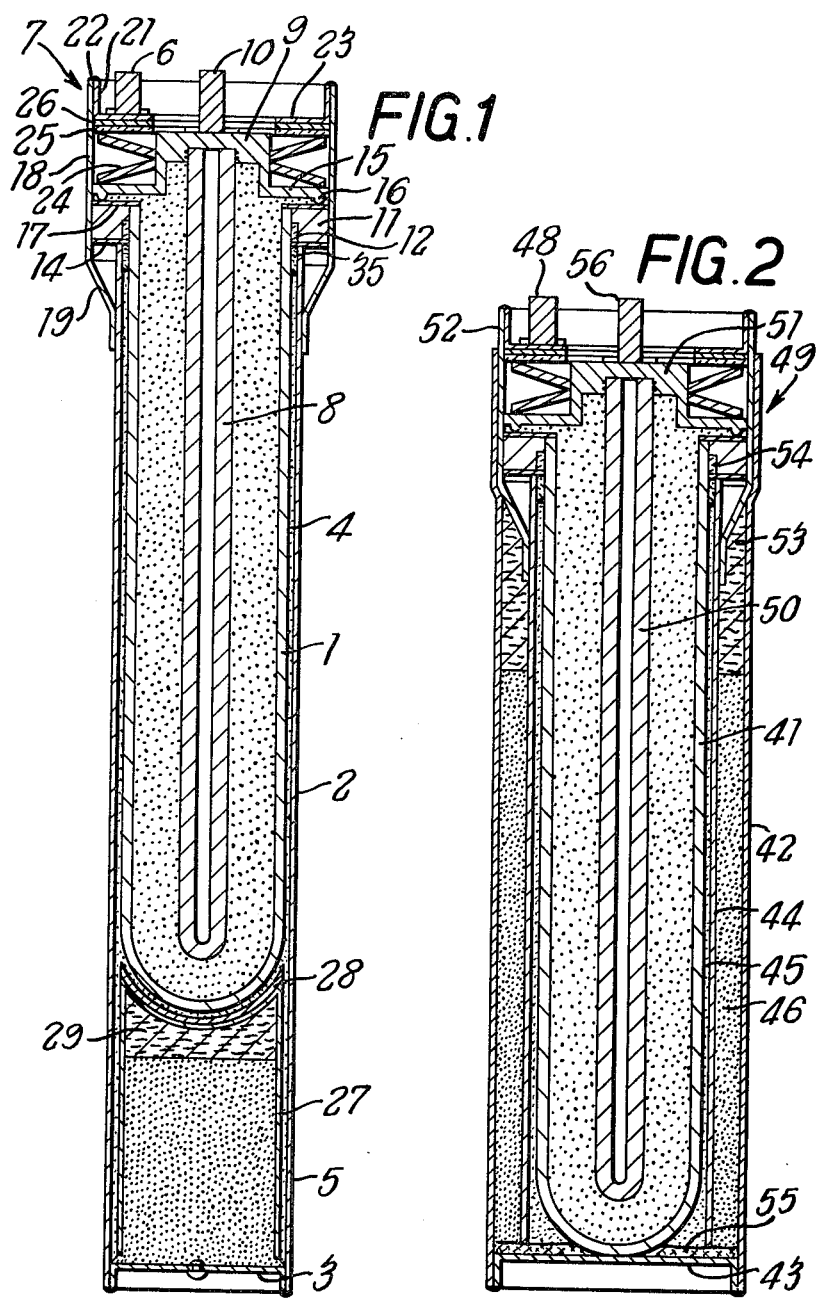

ALKALI METAL-SULPHUR CELLS

This invention relates to alkali metal-sulphur cells, that is to say cells in which the electrochemical reactants are, at the operating temperature of the cell, liquid alkali metal (e.g. sodium) as negative active material (anode) and liquid sulphur material as positive active material (cathode) and anode and cathode compartments are separated by a solid electrolyte which is an alkali metal ion conductor, e.g. beta-alumina in the case of sodium sulphur cells.

In particular the invention relates to alkali metal-sulphur cells of the kind comprising an outer tube, an inner tube forming the solid electrolyte and dividing the interior of the outer tube into anode and cathode compartments adjacent respective sides of the inner tube, and an alkali metal reservoir communicating with the anode compartment. Thus the annular space between the inner and outer tubes can provide the anode compartment and the interior of the inner tube the cathode compartment, or vice versa.

In the operation of alkali metal-sulphur cells it is desirable for safety reasons to have only as much alkali metal available as is necessary for the efficient operation of the cell. Hence, devices are used within the cell to maintain alkali metal in contact with substantially the whole surface area of the cell electrolyte either as the amount available becomes depleted during discharge of the cell, or so that the limited feed from an external reservoir is used effectively. Prior proposals for such devices have mainly taken the form of wicks, which rely upon capillary action to distribute the sodium.

The object of the present invention is to provide an alternative feeding arrangement for the liquid alkali metal.

According to the present invention, in an alklai metal-sulphur cell of the kind described a gas space is created above the alkali metal in the reservoir such that at the operating temperature of the cell the gas pressure in said reservoir will force liquid alkali metal to flow from said reservoir into said anode compartment to maintain the operative surface area of said inner tubular member covered with liquid alkali metal during discharge of the cell.

Said gas space may be created by a porous mass contained within said reservoir and which is not wetted substantially by liquid alkali metal.

Said porous mass may comprise carbon felt or alumina felt.

An advantageous method of constructing an alkali metal-sulphur cell in accordance with the invention entails forming the reservoir and contained alkali metal and gas space as a sub-assembly, and subjecting the anode compartment to a gas evacuation process so that it is at a gas pressure lower than the pressure in said gas space. Thus the alkali metal can be allowed to solidify in the reservoir before assembling the reservoir into the cell and the problem of filling the cell with liquid alkali metal and the attendant problem of ensuring that the liquid alkali metal and sulphur do not come into direct contact during cell assembly is obviated. The evacuation process applied to the anode compartment ensures that during the cell operation when the alkali-metal becomes liquid again it will be forced from the reservoir into the anode compartment by the excess gas pressure in the reservoir.

Sodium-sulphur cells and their method of construction in accordance with the invention will now be described by way of example with refererence to the accompanying diagrammatic drawings, in which:

FIG. 1 shows a cross-section through a first cell construction,

FIG. 2 shows a cross-section through a second cell construction, and

Figure 3:
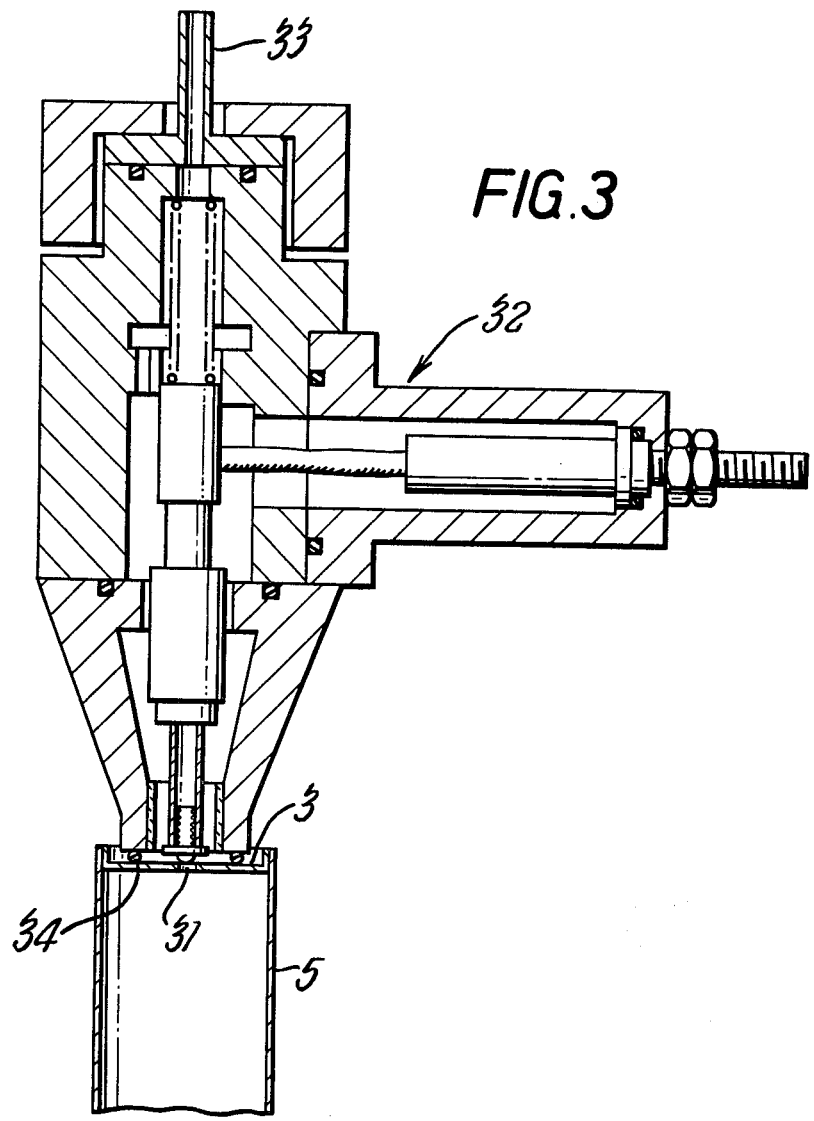
FIG. 3 illustrates a method of evacuating and sealing off the cell of FIG. 1.

Referring to FIG. 1 the cell comprises an inner tube 1 of beta-alumina which has a closed lower end and which constitutes the solid electrolyte of the cell and an outer mild steel tube 2 which is closed at its lower end by a cap 3 and constitutes the cell case. The interior of the tube 1 defines the cathode compartment of the cell and therefore in the charged condition of the of the cell contains sodium. The outer tube 2 extends below the inner tube 1 to provide a housing 5 for a sodium reservoir which may be separated from the annular space 4 by a porous restrictor for example of sintered silicon carbide or electroplated carbon felt. To restrict the amount of sodium available for reaction within the anode compartment the annular space 4 is made as narrow as possible within the manufacturing tolerances for the beta-alumina tube 1.

One current collecting pole of the cell comprises the tube 2 which may be coated on its outside with for example aluminium to improve its conductivity. The case 2 is electrically connected to the negative cell terminal 6 through a sealing and clamping arrangement 7 to be described. The other current collecting pole of the cell comprises an impregnated carbon pole 8 which extends within the beta-alumina tube 1 and has secured to it a cap member 9 which forms part of the sealing and clamping arrangement 7 and which carries the positive cell terminal 10. To improve the conductivity of the tubular pole 8, it may be coated on its inner surface, for example by spraying, with a highly conducting metal.

The sealing and clamping arrangement 7 seals off the upper open ends of the tubes 1 and 2. For this purpose the tube 1 has an alpha-alumina collar 11 secured to it by a glass seal 12, spray coated with alpha-alumina. The collar 11 abuts the top of the case 2 through an aluminium sealing gasket 14 to close off the annular space 4. The cap member 9 has a flange 15 formed with a rib 16 which abuts the collar 11 through an aluminium sealing gasket 17. The assembly is clamped together under compression by a sleeve assembly comprising an outer sleeve 18 which at its lower end inclines inwardly at 19 and is welded to the tube 2 and an inner sleeve 21 which is welded to the sleeve 18 at 22 and has an inturned flange 23 which abuts double disc spring 24 through an insulating gasket 25 and metal shim 26 and urges it against flange 15.

The reservoir is provided by an aluminium container 27 formed separately from the outer tube 2 and whose closed upper end conforms to the closed lower end of the tube 1. A layer 28 of "Grafoil" material is provided between the spaced ends of the tube 1 and container 27 to provide a protecting layer in the event of molten sulphur leaking from the tube 1. The cylindrical side wall of the container 27 is spaced from the inner surface of the housing 5 to provide a feed path for the sodium from the container 27 to the annular space 4.

The upper part of the space within the container 27 is filled with a porous mass 29 of for example carbon felt which is not wetted by sodium and the porous mass 29 is placed in position before the container 27 is loaded with sodium, to create a gas space. The loading of sodium into the container 27 is carried out (in an inert gas atmosphere) before the container 27 is assembled into the tube 2. Preferably the sodium is loaded in liquid form with the container inverted as compared with the orientation shown in FIG. 1. Inert gas, e.g. nitrogen, helium or argon, thus becomes trapped in the porous mass at a pressure of say 1 atmosphere by the sodium since the sodium will not penetrate the porous mass. After loading of the sodium, it is allowed to solidify. Thus the container 27 with the contained sodium and gas space forms a sub-assembly which is then assembled into the tube 2. After this the cap 3 is sealed in position and the remaining space in the sodium side of the cell, namely, the space around the container 27 and the annular space 4 constituting the anode compartment are evacuated.

One convenient method of evacuating the sodium side of the cell will now be described with reference to FIG. 3. In FIG. 3 the housing 5 of the tube 2 with end cap 3 welded in position is shown. The end cap 3 is pre-drilled with a small hole 31 (approximately 0.5mm). Evacuation is carried out through this hole 31 using a modified electric stud welder 32 which has a connection 33 to a vacuum pump. The welder 32 connects with the end cap 3 through an "O" ring 34. Evacuation is carried out to approximately 1 torr. The welder is then operated to insert a stud in the hole 31 and seal it off.

If desired, the open end of the reservoir may be closed by a cap which is fitted before or after loading in of the sodium. The cap would be provided with a hole to provide for the communication with the anode compartment. This hole may be formed automatically by the fitting of the end cap 3 to the tube 2. For example the cap 3 could be provided with a spike which pierces the cap on the container 27, the cap being formed of a metal foil material which is sealed on the container and is readily pierced by the spike.

It is not essential to use the porous mass 29 to form the gas space. For example a container could be part-filled with sodium to leave the gas space above the sodium and then capped. The bottom of the container would then be drilled or trepanned to form a hole providing the communication with the anode compartment.

If desired a ring of carbon felt may be positioned at the upper end of the annular space 4 as indicated by reference numeral 35 in order to prevent the glass seal being attacked by the liquid sodium in the space 4. Carbon felt is suitable for the porous masses because it is not substantially wetted by sodium. In the event of the closed upper end of the container 27 being corroded away and failure of the beta-alumina tube 1, the hazard of the molten sulphur escaping from the cathode compartment and coming into contact with the molted sodium in the container 26 is prevented by the porous mass 29 as well as by the "Grafoil" layer 28.

The annular space 4 may contain a capillary wick if desired, for example comprising carbon felt which is metallised or metal plated or has a metal flame-sprayed coating. Such a wick, which will be readily wetted by sodium, will minimise the amount of sodium in the annular space 4.

It is not necessary to evacuate the sodium side of the cell in the manner described above, for the pressurised feed of the sodium from the container 27 to the annular space 4. For example with the ring 35 of carbon felt in position, the sodium side of the cell can be filled with liquid sodium, including the annular space 4 and the space between the container 27 and the tube 2. Two gas spaces are then created in the cell, one in the space 4 by ring 35 and the other in the container 27 by porous mass 29. Heating of the cell to its operating temperature of about 350° C will increase the pressure of the gas in the two gas spaces as a result of Boyle's Law expansion. However the change in density of sodium on heating will cause a greater compression of the gas space in the container 27, because of the significantly larger amount of sodium in the container 27 than in the annular space 4. On discharging the cell, although the level of sodium in the container 27 falls, the head of sodium in the annular space 4 is substantially maintained by the excess gas pressure in the container 27. Admittedly there is a drop in the sodium level in the annular space 4, but this is negligible since the initial volume of the gas space above the sodium in the annular space 4 is so small as compared with the initial volume of the gas space in container 27.

Referring now to FIG. 2, the cell comprises inner tube 41 of beta-alumina, which has a closed lower end and which constitutes the electrolyte of the cell and an outer mild steel tube 42, which is closed at its lower end by a welded-on end cap 43 and which constitutes the outer case of the cell. The interior of the tube 42 constitutes the cathode compartment of the cell. A sleeve 44 extends between the tubes 41 and 42, to form two annular spaces 45 and 46 which form the anode compartment and the sodium reservoir respectively of the cell. The anode compartment 45 and reservoir 46 communicate with each other beneath the lower end of the sleeve which is spaced from the end cap 43 to provide a feed gap.

The outer tube 42 constitutes one current collecting pole of the cell and connects with the negative cell terminal 48 via a sealing and clamping arrangement 49. The other current collecting pole of the cell comprises an impregnated tubular carbon pole 50 which extends within the beta-alumina tube 41 and has secured to it an end cap member 51 which forms part of the sealing and clamping arrangement 49 and which carries positive cell terminal 56.

As can be seen, the sealing and clamping arrangement 49 is the same as that shown in FIG. 1 except that outer sleeve 52, corresponding to sleeve 18, is welded at its tapering lower end to sleeve 44 and the outer tube 42 is secured at its upper end e.g. by welding or brazing, to the outer sleeve 52.

At the upper end of the reservoir 46 is a porous mass 53, e.g. of carbon felt which is not substantially wetted by liquid sodium, and serves the same function of creating a gas space as the porous mass 29 of the cell of FIG. 1.

After loading of the sodium into the reservoir 46, the sodium side of the cell is evacuated and then sealed off the the same manner as the FIG. 1 cell.

It will be appreciated that as a modification of the cell construction of FIG. 2, the outer tube 42 and the sleeve 44 could be replaced by an annular container. This would enable, as in the case of the FIG. 1 construction, the sodium reservoir and contained sodium and gas space to be formed as a sub-assembly which is subsequently brought together with the other cell components.

As in the case of the FIG. 1 cell, a ring, of for example carbon felt, indicated at 54 may be placed at the upper end of the end of the anode compartment to protect the glass seal. Also in the same manner as described with reference to FIG. 1, the cell can be made to operate without evacuating the sodium side of the cell.

The sleeve 44 depending upon its design and method of mounting within the cell can be made of various materials. Thus many of the common metals could be used. Alternatively non-metals such as carbon, glass or ceramic in the form of a flanged tube could be used. Also, as shown in FIG. 2 restriction of sodium flow can be provided by locating the lower edge of the sleeve 44 on a compressible porous material 55, e.g. graphite felt.

We claim:
1. An alkali metal sulphur cell comprising:
   an outer tube;
   an inner tube forming the solid electrolyte of the cell and dividing the interior of the outer tube into anode compartment and cathode compartment adjacent respective sides of the inner tube; said anode containing alkali metal; said cathode containing sulphur material;
   the annular space between the outer tubes constituting the anode compartment of the cell;
   an alkali metal reservoir in communication with said anode compartment;
   means located at the lower end of said anode compartment for defining an inlet and communicating passage to said anode compartment from said alkali metal reservoir;
   the outer tube extending at one end beyond the inner tube to provide a housing for said alkali metal reservoir which is spaced from the inner surface of the outer tube to define a communicating passage for alkali metal from said reservoir to said anode compartment;
   gas space closed to the atmosphere above the alkali metal in said reservoir for forcing alkali metal at the operating temperature of the cell to flow upwards into said anode compartment via said inlet for maintaining the operative surface area of said inner tube covered with liquid alkali metal during discharge of the cell.

2. An alkali metal-sulphur cell according to claim 1, wherein said reservoir comprises a container formed separately from the outer tube.

3. An alkali metal-sulphur cell according to claim 1, wherein said reservoir communicates with said anode compartment through a flow restrictor for alkali metal.

4. An alkali metal sulphur cell comprising:
   an outer tube;
   an inner tube forming the solid electrolyte of the cell and dividing the interior of the outer tube into anode compartment and cathode compartment adjacent respective sides of the inner tube; said anode containing alkali metal; said cathode containing sulphur material;
   an alkali metal reservoir in communication with said anode compartment;
   the space between said inner and outer tubes is divided into a first annular space adjacent said inner tube and a second annular space adjacent said outer tube, said first annular space constituting said anode compartment and said second annular space constituting said alkali metal reservoir;
   means located at the lower end of said anode compartment for defining an inlet to said anode compartment from said alkali metal reservoir;
   gas space closed to the atmosphere above the alkali metal in said reservoir for forcing alkali metal at the operating temperature of the cell to flow upwards into said anode compartment via said inlet for maintaining the operative surface area of said inner tube covered with liquid alkali metal during discharge of the cell.

5. An alkali metal sulphur cell comprising:
   an outer tube;
   an inner tube forming the solid electrolyte of the cell and dividing the interior of the outer tube into anode compartment and cathode compartment adjacent respective sides of the inner tube; said anode containing alkali metal; said cathode containing sulphur material;
   an alkali metal reservoir in communication with said anode compartment;
   means located at the lower end of said anode compartment for defining an inlet to said anode compartment from said alkali metal reservoir;
   a porous mass within said reservoir for creating a gas space closed to the atmosphere above the alkali metal in said reservoir for forcing alkali metal at the operating temperature of the cell to flow upwards into said anode compartment via said inlet for maintaining the operative surface area of said inner tube covered with liquid alkali metal during discharge of the cell, and wherein said porous mass is not substantailly wetted by said liquid alkali metal.

6. The apparatus of claim 5 wherein said porous mass comprises carbon felt or alumina felt.

7. An alkali metal-sulphur cell according to claim 5, wherein said gas space is created in said anode compartment at its end remote from the communication with the reservoir, the volume of the space in said anode compartment being small relative to the gas space in the reservoir.

8. A method for making an alkali metal sulphur cell which comprises:
   providing an outer tube;
   providing an inner tube which forms the solid electrolyte of the cell and divides the interior of said outer tube into anode compartment and cathode compartment adjacent respective sides of the inner tube;
   providing an alkali metal reservoir communicating with said anode compartment;
   creating a gas space above the alkali metal in said reservoir for forcing alkali metal at the operating temperature of the cell to flow from said reservoir into said anode compartment for maintaining the operative surface of said inner tube covered with liquid alkali metal during discharge of the cell;
   subjecting the anode compartment when empty of alkali metal to a gas evacuation process for providing said anode compartment at a gas pressure less than the pressure in said gas space; and
   forming said alkali metal reservoir with the contained alkali metal and gas space as a sub-assembly.

9. A method according to claim 8 which comprises providing annular space between said inner tube and said outer tube to constitute said anode compartment, providing a housing for said alkali metal reservoir by extending said outer tube at one end beyond said inner tube, defining a communicating passage for alkali metal from the reservoir to said anode compartment by spacing said housing from the inner surface of said outer tube, providing an end cap for said outer tube at its end adjacent said reservoir, providing a hole in said end cap through which said anode compartment is evacuated, and sealing said hole after evacuation.

10. A method according to claim 9, which comprises effecting said evacuating and sealing by a vacuum stud welder, which engages said end cap through an 'O' ring.

* * * * *